No. 739,630. PATENTED SEPT. 22, 1903.
C. YORGER.
CASH AND CREDIT ACCOUNT CABINET.
APPLICATION FILED JULY 25, 1902
NO MODEL. 6 SHEETS—SHEET 1.

WITNESSES:
Dow W. Vorhies.
Stella Snider.

INVENTOR:
Charles Yorger,
BY E. T. Silvius,
ATTORNEY.

No. 739,630. PATENTED SEPT. 22, 1903.
C. YORGER.
CASH AND CREDIT ACCOUNT CABINET.
APPLICATION FILED JULY 25, 1902
NO MODEL. 6 SHEETS—SHEET 2.

WITNESSES: INVENTOR:
Dow W. Vorhies. Charles Yorger,
Stella Snider BY E. T. Silvius,
ATTORNEY.

No. 739,630. PATENTED SEPT. 22, 1903.
C. YORGER.
CASH AND CREDIT ACCOUNT CABINET.
APPLICATION FILED JULY 25, 1902.
NO MODEL. 6 SHEETS—SHEET 3.

WITNESSES: INVENTOR:
Don W. Voorhies. Charles Yorger,
Stella Snider. BY E. T. Silvius.
ATTORNEY.

No. 739,630. PATENTED SEPT. 22, 1903.
C. YORGER.
CASH AND CREDIT ACCOUNT CABINET.
APPLICATION FILED JULY 25, 1902.
NO MODEL. 6 SHEETS—SHEET 5.

WITNESSES.
Don W. Voorhies.
Stella Snider.

INVENTOR:
Charles Yorger,
BY E. T. Silvius,
ATTORNEY.

No. 739,630. PATENTED SEPT. 22, 1903.
C. YORGER.
CASH AND CREDIT ACCOUNT CABINET.
APPLICATION FILED JULY 25, 1902.
NO MODEL. 6 SHEETS—SHEET 6.

WITNESSES:
Don W. Vorhies.
Stella Snider.

INVENTOR:
Charles Yorger,
BY E. T. Silvius,
ATTORNEY.

No. 739,630. Patented September 22, 1903.

UNITED STATES PATENT OFFICE.

CHARLES YORGER, OF INDIANAPOLIS, INDIANA.

CASH AND CREDIT ACCOUNT CABINET.

SPECIFICATION forming part of Letters Patent No. 739,630, dated September 22, 1903.

Application filed July 25, 1902. Serial No. 116,905. (No model.)

*To all whom it may concern:*

Be it known that I, CHARLES YORGER, a citizen of the United States, residing at Indianapolis, in the county of Marion and State of Indiana, have invented new and useful Cash and Credit Account Cabinets; and I do declare the following to be a full, clear, and exact description of the invention, reference being had to the accompanying drawings, and to the characters of reference marked thereon, which form a part of this specification.

My invention relates to improved apparatus for the use of merchants, especially retail dealers, in recording sales, both cash and credit, and for taking care temporarily of the cash received, the invention having reference more particularly to cash-registers or equivalent devices whereby the cash sales may be immediately indicated and also privately recorded, so as to be summed up periodically or when desired, and embracing a money-drawer and an alarm-bell.

The invention has reference also to improvements in the devices for keeping permanent records of the cash and credit sales.

The object of the invention is to provide simple, cheap, and economical cash-registers and credit-account records combined in compact convenient forms.

With the above-mentioned object in view my invention consists in a register-board having the money denominations indicated permanently thereon, indicators by which the various denominations may be referred to and read intelligently, and means for operating the indicators when cash sales are made, the invention consisting also in a shutter for the register-board and indicators and in the novel parts and the combination and arrangement of parts, as hereinafter particularly described, and pointed out in the claims appended.

Referring to drawings.

Similar reference characters in the several figures of the drawings indicate corresponding parts.

In practically carrying out my invention I provide a suitable frame and casing as parts of the cabinet, which may be variously formed in detail and also be more or less ornamented, according to fancy. A relatively low front portion A is covered by the keyboard B, above which project a suitable leaf-rest $a$ and the operating-keys $b$ $b'$, the latter being guarded by means of the rest $a$. In the front are suitable openings into which are fitted the cash-drawer C and also a drawer D at one side of the drawer C, the function of which will be described hereinafter. Besides suitable sides the frame and case includes a rear lower frame portion $A'$, a hinged lid $A^2$, a rear casing $A^3$, vertically disposed, and a roof part $A^4$, preferably slanting, part or all of which may be composed of glass.

A suitable number of billing-leaves E are mounted at the rear of the keyboard on an inclined frame, so that the hinge-rods $d$ thereof lie in an inclined plane, being supported by longitudinally-channeled tops $g$ of a suitable frame, each rod having a paper-clip $e$ attached thereto for holding the paper bill-forms upon the leaves. Each leaf is provided with one or more balance-springs $h$, coiled about the rod $d$ and having one arm thereof seated in the channeled top and the other arm extending against the under side of the leaf, the springs $h$ holding the leaves in vertical positions when so placed, but permitting the leaves to lie horizontally. The rear or upper leaf $E'$ is designed to act as a shutter for the register-board. The hinge-frame is removable and has a suitable latch $i$. In some cases when a cash-register only may be desired the billing-leaves E and the inclined hinge-frame may be dispensed with, in which case the shutter $E'$ is retained and may be hinged in a lower plane than that indicated. The inner or upper sides of the leaves have suitable printed blank forms $f$, secured by the clips $e$. The free edges of the leaves E are provided with guards $j$ to prevent the bodies of the leaves from rubbing together when in use, and the index-letters $k$ are stamped into the surfaces of the guards. The leaves are supported when lowered and in use upon the rest $a$.

Figure 22:
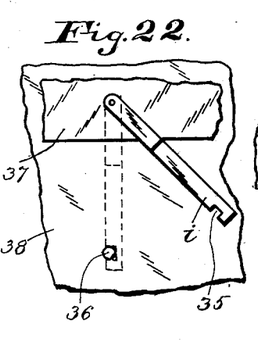
Fig. 22, a top plan view of a latch for the removable frame of the billing-leaves, and Fig. 23 a fragmentary perspective view showing the guides for the teller-stems.

The body of the hinge-frame may be constructed in any suitable manner, so that the ends having the channeled tops are connected together. Suitable guides may be provided for resisting the tendency of the balance-springs and leaves to tilt the frame, it being preferable that the frame slide horizontally to and from its position in the case. The latch $i$ may not be necessary, but if used may be a bar pivoted to the body of the frame and extending forwardly beyond the forward hinge-rod $d$, the extremity of the bar having a recess 35 to admit a stud 36, secured to a portion of the case when the bar is moved radially against the stud. In Fig. 22 the part 37 indicates the movable frame, and 38 a portion of the case, the bar being shown in dotted lines engaging the stud.

The register-board F is vertical and faces forwardly at the rear of the keyboard and its shutter $E'$ and is provided with vertical grooves in the face thereof, as guides $G$ $G'$, for the indicators. A glass plate H extends over the front of the board, partially forming the guides, and a glass plate $H'$ extends upwardly from the rear part of the board to the lid $A^2$. The top of the board F is inclined forwardly.

The indicators I comprise a sufficient number of balls of uniform diameters, preferably composed of hard metal, to exactly fill all the guides G and to provide one additional ball for each guide employed. A convenient dimension may be one-fourth of an inch, and the face of the board is marked with figures in horizontal lines one-fourth of an inch apart, or to correspond to the diameters of the balls, so that each ball may be represented, when in a guide, by a number indicating some denomination of money. The balls are supported in the guides upon a base J, extending below the board F and removed therefrom a distance equal to the diameter of a ball. The base J is provided with a suitable number of openings $l$ in a different plane than that of the guides, preferably at the rear of the guides, and an inclined trough K, having an outlet-opening 18, extends beneath the openings $l$. The plurality of openings $l$ may, however, be connected so as to form a long slot, if desired.

Upon the base J a plurality of gates L are mounted so as to slide horizontally immediately beneath the board F, a gate for each guide and column of balls and having a vertical diameter equal to the diameter of a ball. Each gate is normally held in closed position against a suitable stop by a suitable spring $m$, preferably secured to the back of the board F and extending into a recess 28 in the rear upper portion of the gate. A rocking bar M extends across the rear ends of the gates normally in contact therewith or having operative connection therewith and so held by means of a suitable spring $n$. The arms N of pivoted levers are connected to the gates L, one to each gate, for operating them in opposition to the springs. Each gate has an opening $p$ therethrough adapted to receive a ball of the indicators, and when the gates are closed they each contain a ball.

It will now be seen that when the gates are closed the openings $p$ are in alinement with the guides, and if a gate be moved rearwardly the ball in the opening $p$ will be drawn over an opening $l$ in the base and drop into the trough $k$, and the guide-groove will be closed at the same time, the column of indicator-balls being momentarily supported upon the imperforate portion of the gate. Upon return of the gate to its normal position the lower ball of the column will descend into the opening of the gate, the whole column of balls descending a distance equal to the diameter of a ball.

A plurality of key-levers O are mounted in a plane below the keyboard, their rear ends being connected to the frame part A' by means of a pivot-rod $s$, suitably supported, the levers extending forwardly into guide-slots $t$ in the front portion A. The levers O are connected by means of links $r$ to arms N' of the levers having the arms N, which have supporting-pivots $q$. The keys $b\ b'$ have stems extending through openings in the keyboard to the levers O, upon which the stems rest and to which they may be attached. The arms N' have elongated curved fingers $N^2$, reaching above other devices, and are designed to operate the tellers or devices for indicating the amounts of the separate cash sales, as will hereinafter appear. A locking-bar P is mounted slidingly beneath the levers O, near the free ends thereof, so that the levers, when locked, rest upon the bar, the bar having recesses 19, into which the levers may descend when the bar is moved endwise, so that the recesses are in range of the levers. The bar has a knob 20 for operating it, and a suitable lock $u$ may be provided for locking the bar against movement.

At the upper rear part of the board F are supporting and guide members $v$ and $w$, formed either separately or in one piece and supported horizontally, in which are mounted the stems Q, having fingers $x$ at their lower ends, of the tellers $y$, the latter resting upon the top of the member $w$ and the stems projecting somewhat below the member $v$. Springs R are secured to the member $w$ and press against the sides of the stems Q, and thus frictionally hold the stems in their guides when the tellers are elevated. A treadle is pivoted to a beam 1 and comprises a bar S, extending horizontally across the rear of the stems Q below the member $v$, and the pivoted connecting-arms S'. Suitable guides and stops, as described hereinafter, are provided, against which the fingers $x$ operate. A beam 2 pivotally supports arms T, which are connected by links 3 to the fingers $N^2$, one end of each of the arms T having a flat end extending beneath a finger $x$, there being as many arms T as there are tellers. A link 4 is connected to an arm S' and extends nearly to the bottom of the cabinet. A suitable spring 5 normally holds the bar S in its most elevated position, the link 4 being designed to draw down the bar S at proper times for withdrawing the tellers from view.

Figure 23:
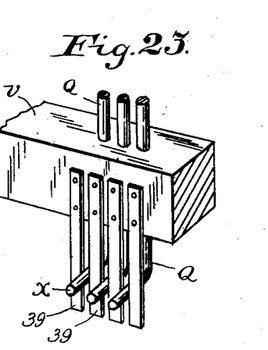

The guides and stops hereinbefore referred to may be variously provided. In Fig. 23 guides are shown comprising vertical bars 39, secured to the member $v$ and depending therefrom, so that the fingers $x$ extend between the bars, and thus prevent rotative movements of the teller-stems Q. As stops to the upward movements of the stems the fingers may engage the bar S and the latter engage the member $v$, or the devices may be so designed that the fingers may engage the member $v$.

A rocking lever having arms U and U' is supported at the bottom of the cabinet by a pivot 6, and the arm U is connected to the link 4, the arm U' being engaged by the end of a slightly-elastic push-bar V, attached to the back C' of the cash-drawer when the latter is being closed, the bar V also coacting with a throw-off member W. Springs 7 are suitably mounted so as to be pressed by the drawer C to push the latter open when released from its latch X, which is suitably supported by a pivot between its ends. The bar V has a finger 8, adapted to ride upon the inclined end 10 of the member W, and a finger 9, adapted to push against the side of the arm U' until raised above the latter by means of the finger 8. A lever Y is supported at one end by a pivot 11 at the front A and is connected by a link 12 to the latch X, the free end of the lever being connected by a link 13 to the arm 15 of a lever having also an arm 14, suitably supported pivotally, the arm 14 being connected by means of a connecting-rod 16 with the rocking bar M.

A bell or gong 17 is suitably supported upon which to sound alarms when registering the sales. A connecting-rod 21 is attached to the bar M and also to a swinging arm 22, carrying a pivoted tripper 23, pressed by a spring 24. A bell-striker 25 is pivoted conveniently and has a stop 26, against which the striker is pressed by a spring 27, one free end of the striker being in range of the tripper 23, while the other free end may strike the bell when operated.

In some cases a spring 29 may be employed in connection with the arm U to assist the spring 5 at the lower end of the train of connections. The drawer D should be provided with a lock.

Figures 1, 2, 3, 4:
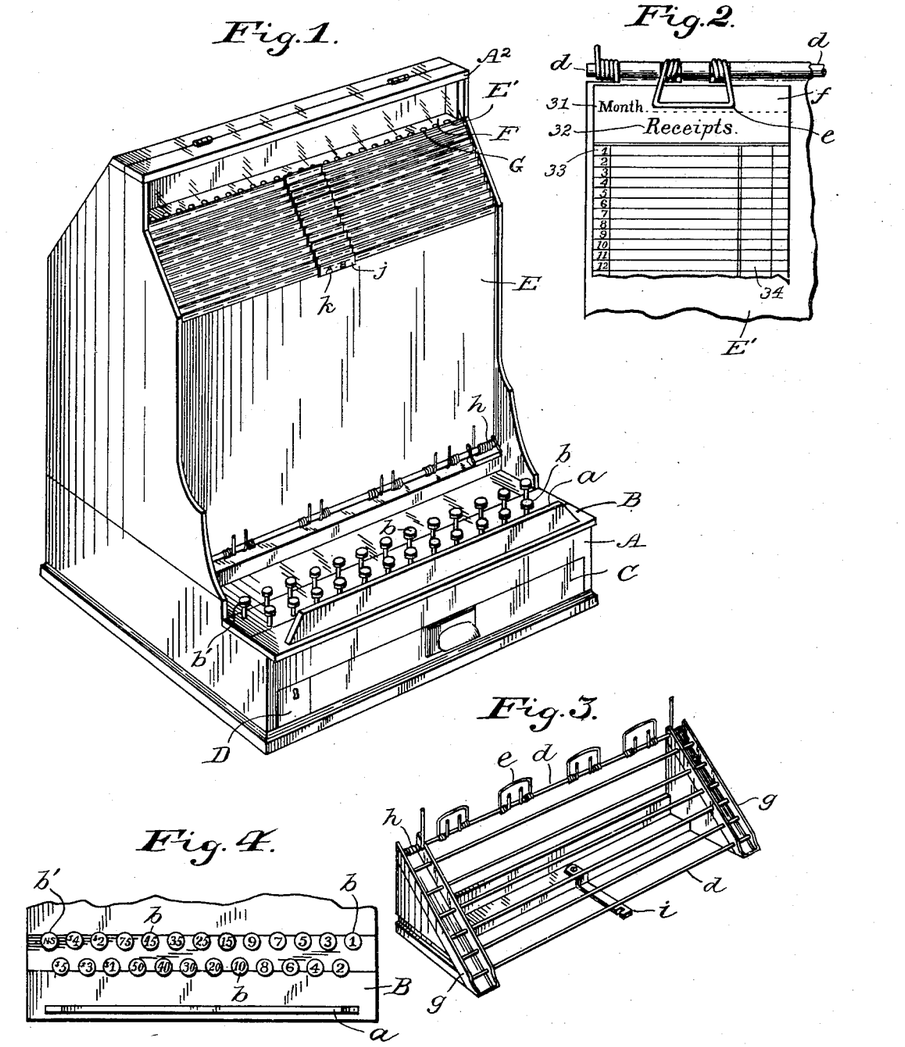
Figure 1 is a perspective view of the complete invention as when ready to be operated.
Fig. 2, a fragmentary plan view of the shutter for the register-board, showing a portion of a record-leaf thereon.
Fig. 3, a perspective view of the frame for supporting the shutter and also billing-leaves.
Fig. 4, a fragmentary plan view of the keyboard of the cash-register and the keys thereon.
Figure 5:
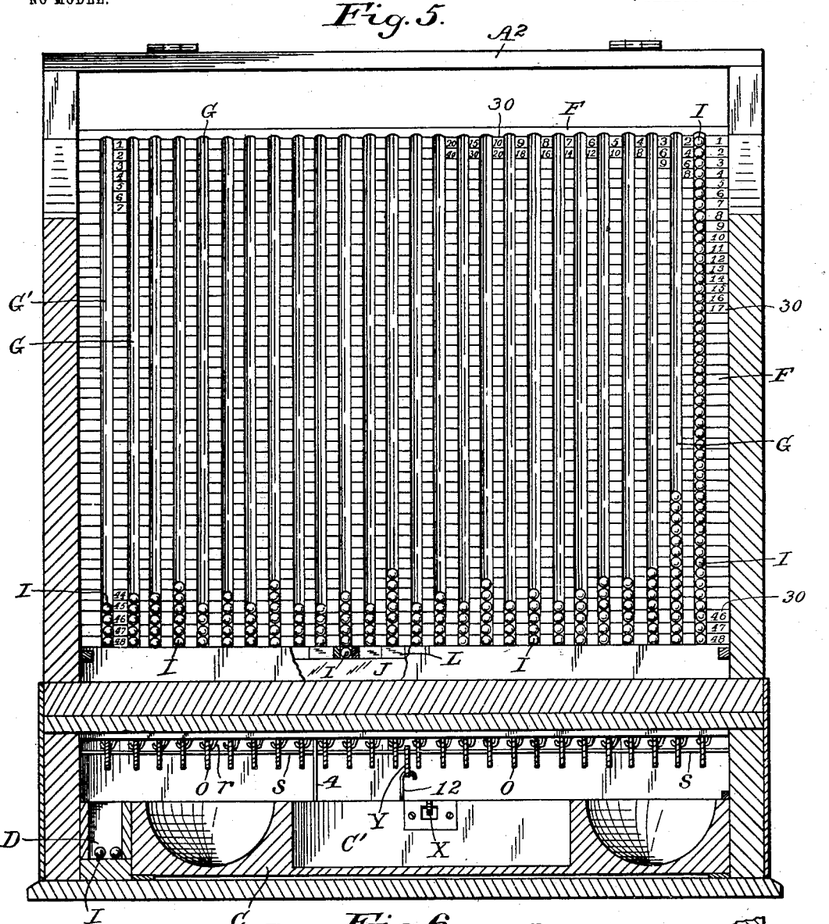
Fig. 5, a vertical sectional view in a plane at the front of the register-board and showing the front plan thereof and the drawers in cross-section.
Figure 6:
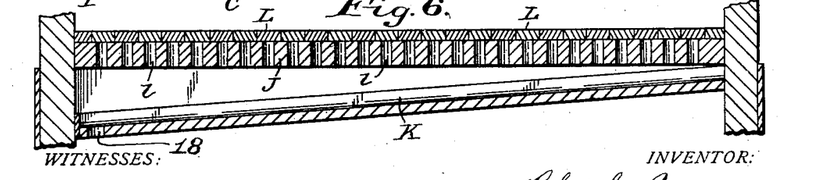
Fig. 6, a fragmentary sectional view taken in a vertical plane nearly corresponding to the plane of the register-board and showing details of parts immediately below the board.
Figures 7, 8:
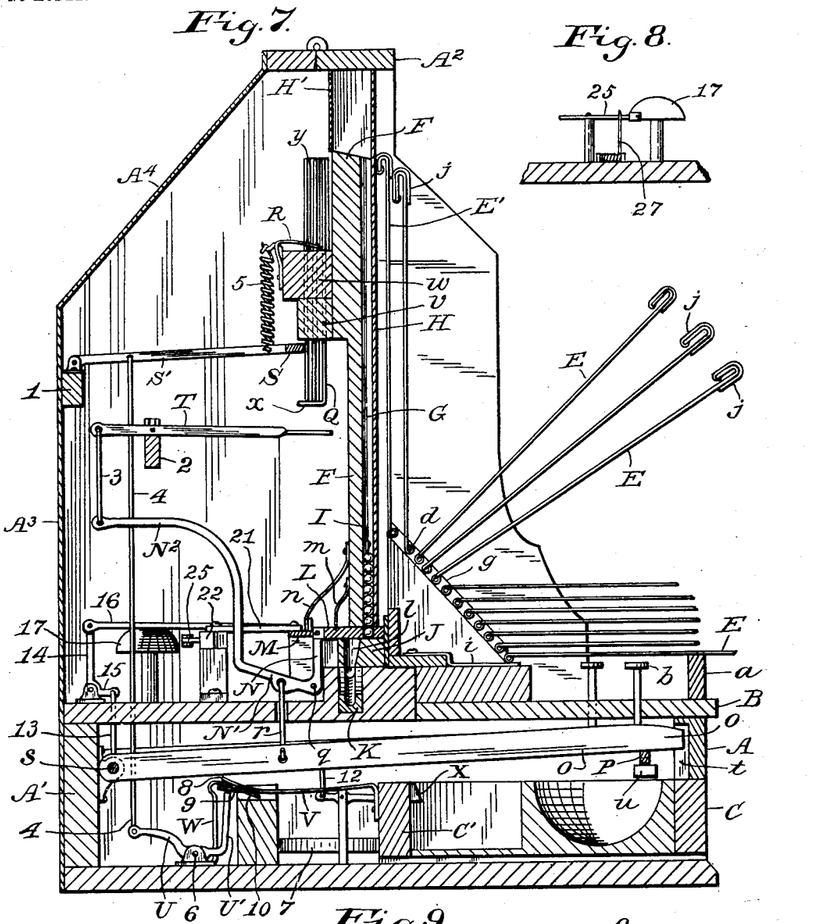
Fig. 7, a vertical longitudinal sectional view, or in a plane at right angles to the plane of the register-board, showing various parts of the mechanism in side elevations.
Fig. 8, a side view of the gong and its hammer and operating-spring.
Figure 9:
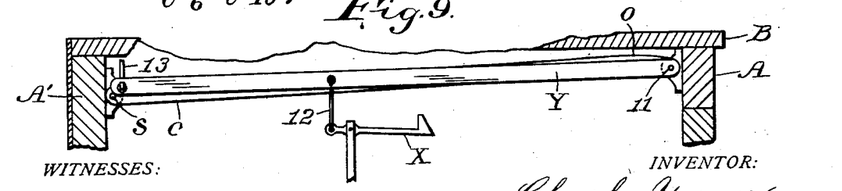
Fig. 9, a fragmentary view similar to that of Fig. 7, but in a different plane, and showing parts of the mechanism more clearly than in the other figure.
Figure 10:
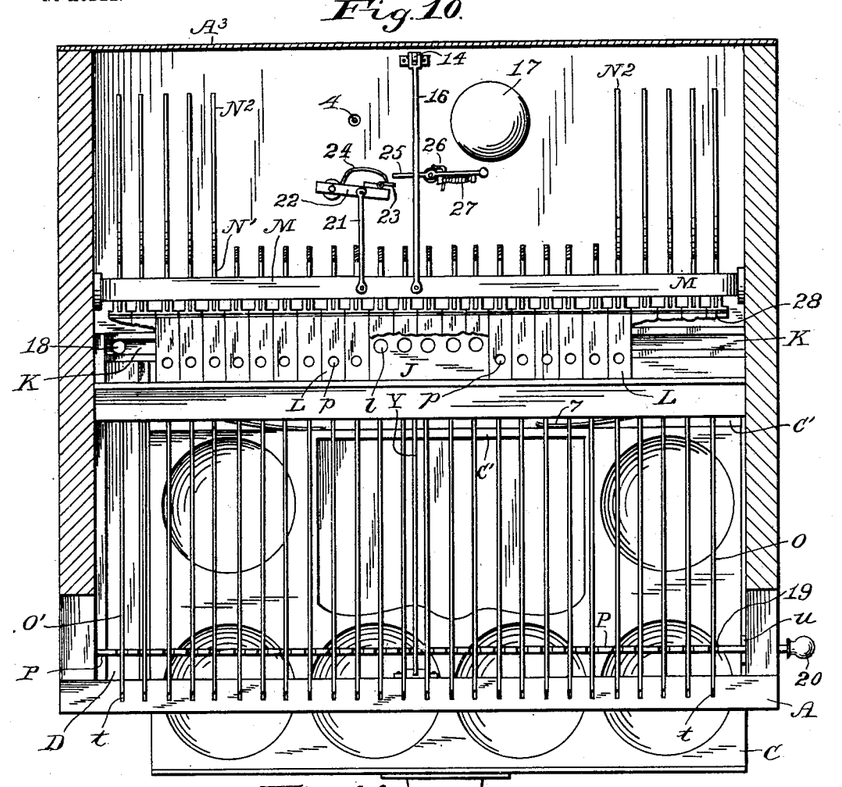
Fig. 10, a horizontal sectional view approximately in a plane at the bottom of the register-board, the keyboard and the billing-leaves being omitted.
Figure 11:
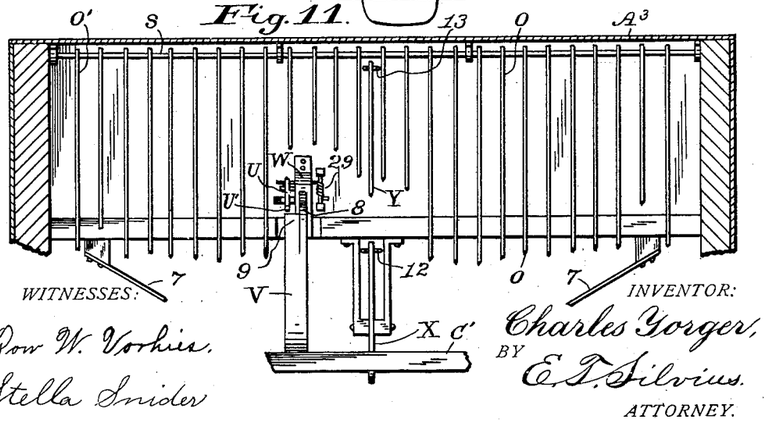
Fig. 11, a fragmentary horizontal sectional view similar to that of Fig. 10, but in a lower plane, showing the drawer-latching mechanism and the rear ends of the operating-levers.
Figures 12, 13, 14, 15, 16, 17:
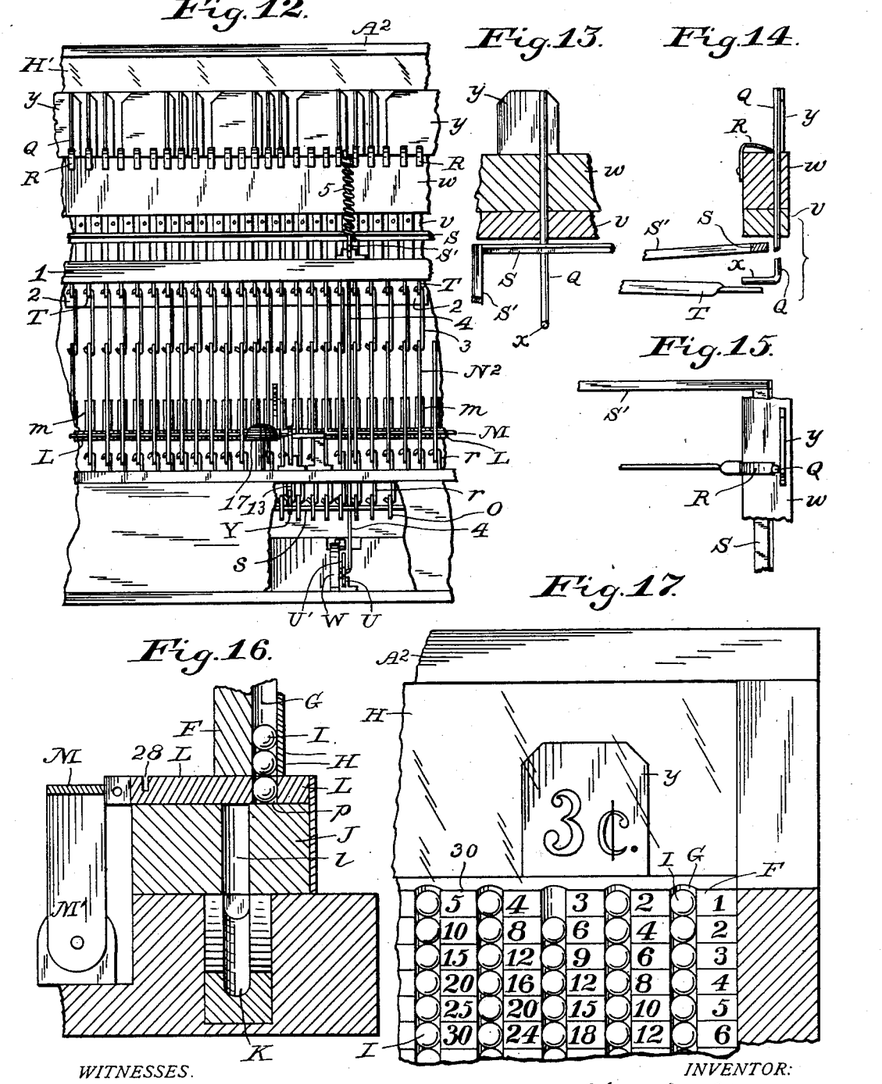
Fig. 12, a fragmentary rear elevation view with the casing omitted, showing the operating mechanism.
Fig. 13, a fragmentary sectional view and showing the rear of one of the "tellers" for indicating the amounts of the separate cash sales.
Fig. 14, a fragmentary sectional view taken in a vertical plane at right angles to that of Fig. 13, showing the means which directly control the tellers.
Fig. 15, a fragmentary top plan view of the parts shown in Fig. 14.
Fig. 16, a fragmentary sectional view in a vertical plane at right angles to the plane of the register-board, showing the lower portion thereof and also parts situated below the board.
Fig. 17, a fragmentary front elevation of the register-board, showing the manner in which the money denominations are arranged thereon.
Figure 18:
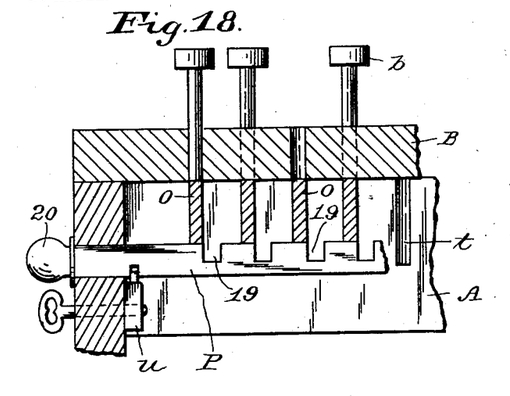
Fig. 18, a fragmentary transverse vertical sectional view looking forwardly, showing the locking-bar for the key-levers and also the lock for the bar.
Figure 19:
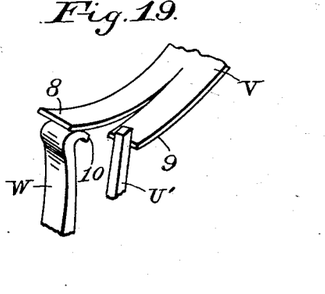
Fig. 19, a fragmentary perspective view showing the operative portions of the push-bar of the cash-drawer and the parts with which it operates.
Figure 20:
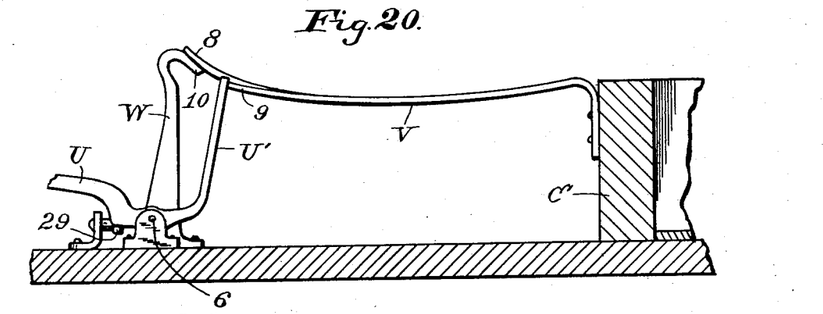
Fig. 20, a fragmentary longitudinal vertical sectional view showing the push-bar and devices with which it operates in side elevation.
Figure 21:
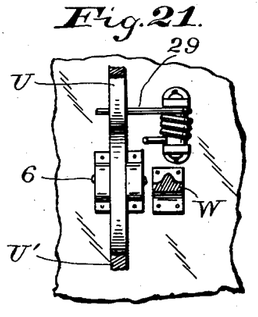
Fig. 21, a fragmentary top plan view showing a reversingspring for one of the levers operated by the push-bar.

In Fig. 5 only a few of the register numbers 30 are shown on the board F as illustrations of their arrangement. On a larger scale they are shown in Fig. 17. The different denominations may be variously arranged, provided, of course, that they agree with the arrangement of the keys and the tellers. As a convenient arrangement, the first column at the right of the board and the right-hand key are employed for registering all purchases of one cent each; the next to the left, all purchases of two cents each; the next to the left, three-cent purchases, and so on, advancing in the amounts with each succeeding column, as will be understood. The first column alongside of the right-hand indicator column of balls is numbered, consecutively, from "1" at the top to the bottom of the board—as, for instance, to "48"—and so is one other column, as for the indicators in the guide G' and key $b'$ at the extreme left-hand side, for registering "no sale" there being a number horizontally opposite every ball or space that may be occupied by a ball I. In the register-column for two-cent sales the upper figure is "2," the next "4," &c., each number below being two units greater in value than the number next above. The other sales-register columns are similarly numbered to correspond with each denomination. The denominations toward the right represent "cents" and those toward the left represent "dollars."

In order to have a convenient record at hand of the gross daily cash sales, the inner or upper side of the shutter E is provided with blank forms, which have thereon the names of the months 31, the word "Receipts," as at 32, the numerical days of the month, as at 33, and amount-columns 34. Various other forms may also be employed, thus dispensing entirely with account-books.

In practical use the keys are to be pressed down, as is well understood, when a cash sale is to be registered or the cash-drawer is to be opened for any purpose, the locking-bar P having first been properly set to permit the levers O to be operated. When a sale is made, for instance, amounting to three cents, the teller $y$, as in Fig. 17, will so indicate, and the lower ball in the three-cent guide will be dropped into the trough K, in which it will roll to the opening 18 and drop into the drawer D. The lower ball having been removed and the gate L closed, the whole column of balls will descend, leaving a space vacant at the top of the register-column, as in Fig. 17. In summing up the sales the numbers at the blank spaces immediately above the register-balls only are to be read and taken into account.

An understanding of the operation of the mechanism may be had by describing what follows the action of any one of the keys. The key being depressed, the forward end of the lever O will descend, drawing down the arm N' and rocking the arm N, which opens the gate L, the finger $N^2$ actuating the arm T, which throws up the proper teller to view above the board F. Simultaneously the rocking bar M is actuated by the gate and motion given to the rod 16, the lever-arms 14 and 15, the link 13, the lever Y, the link 12, and the latch X, releasing the cash-drawer C, which is forced open by the springs 7. Release of pressure on the key will permit the various parts mentioned except the drawer and the teller to resume their normal positions, the teller being retained by the spring R. It will be understood that the spring $n$ will cause the drawer-latch to be again set, so as to automatically engage the drawer when again closed. While the first movement of the bar M takes place the rod 21 actuates the tripper 23, which trips the striker 25, causing an alarm by the bell 17. In this movement the tripper 23 passes by the striker end, and on the return movement of the bar M the tripper being hinged is dragged across the end of the striker. In closing the drawer the finger 9 will push against the arm U', which by means of the arm U and link 4 will actuate the treadle-bar S, which will draw down the teller, which being done the finger 8 will cause the finger 9 to rise above the arm U', and the top of the arm, forced by the spring 29, will return under the finger 9. It will be understood that when the key is pushed down a register-ball will disappear from the column, and when the key ascends, closing the gate, the column of balls will descend. The registers may also be operated while the cash-drawer remains open; but the tellers will not disappear until the drawer is closed.

It will be understood that the shutter E' covers the register-board and prevents the curious from noting the amount of gross sales. When it is desired to sum up the day's gross cash sales, the shutter may be drawn down over the keyboard and the amounts indicated on the register-board read and set down on the receipts-blank attached to the shutter. In reading the amounts the numbers in the different denominations are to be first added together, of course, before entering the total amount on the blank.

The credit sales may be entered on the blanks properly provided upon the billing-leaves E, all in the same cabinet with the cash-register, the convenience of which will be apparent. The billing-leaves as independent features are well known and need no further description. At the close of business-hours the billing-leaves and the shutter may be removed from the case and placed in a safe for the night.

It will be understood that at any time after having summed up the cash sales as indicated on the register-board the drawer D may be unlocked and the balls transferred therefrom to the indicator-guides G G', all of which will be filled from the upper ends thereof.

It will be understood that while the indicators are here composed of balls or globes they may be formed in various patterns, so that they may be operated in vertical columns and attain the same results as by the use of the balls in substantially the same manner, and the register-board may be slightly inclined, if preferred.

Having thus described my invention, what I claim as new is—

1. A cash-register including a register-board, ball-indicators, guides for the indicators, key-levers, an apertured base supporting the ball-indicators, gates mounted slidingly on the base and controlling the indicators, a movable bar attached to arms pivoted at their ends and normally extending across the rear ends of the gates, gate-levers connected to the gates adjacently to the bar, a drawer, a latch for the drawer, links connected to the gate-levers and also to the key-levers, a spring pressing the movable bar against the gates, and operative devices connected to the movable bar and also to the latch.

2. A cash-register including a register-board, indicators, indicator-guides, key-levers, gates controlling the indicators, springs attached to the back of the register-board and engaging the gates, a movable bar having arms pivotally supported at their ends and engaging the gates, a spring pressing the movable bar toward the gates, gate-levers connected to the gates, a drawer, a latch for the drawer, links connected to the gate-levers and also to the key-levers, and operative devices connected to the movable bar and also to the latch.

3. A cash and credit account cabinet including a register-board, indicators coöperating with the register-board, key-levers, means connected with the key-levers for operating the indicators, a cash-drawer, a drawer-latch, means connected with the key-levers whereby the latch may be operated, tellers, means for operating the tellers, a bell, means for operating the bell, a shutter pivoted at the lower portion thereof at the front of the register-board and the indicators, and a balance-spring for the shutter.

4. A cash-register including a case, guides at the front of the case, key-levers pivoted at the back of the case and coöperating with the guides, operating-keys, a register-board, indicators, indicator-guides, gates controlling the indicators, pivoted gate-levers, links connected to the gate-levers and also to the key-levers, a latch-lever pivoted at the front of the case and extending to the back part thereof, a drawer, a latch for the drawer connected to the latch-lever, a rocking bar in the path of movement of the gates, and means operatively connected with the rocking bar and also with the latch-lever.

5. A cash-register including a register-board, indicators, indicator-guides, key-levers, means connected with the key-levers for operating the indicators, a cash-drawer having a push-bar attached thereto having a pair of fingers, a lever operated by one of the fingers, a link connected to the lever, a spring pressing the lever, a throw-off device in the path of the other one of the fingers of the push-bar, tellers, connecting devices connected to the lever and coöperating with the tellers, a latch for the drawer, and means for operating the latch.

6. A cash-register including a register-board, indicators, guides for the indicators, operating-keys, key-levers, gates controlling the indicators, tellers for the register-board, arms having fingers adapted to engage the teller-stems, levers connected with the gates and also with the arms, and links connected to the levers and also to the key-levers.

7. A cash-register comprising a register-board, indicators, guides for the indicators, operating-keys, key-levers, gates controlling the indicators, tellers for the register-board, means connected with the key-levers whereby the gates and the tellers may be operated simultaneously, a shutter at the front of the register-board, a cash-drawer having a push-bar attached thereto having a pair of fingers, a lever operated by one of the fingers, a link connected to the lever, a treadle connected to the link and adapted to withdraw the tellers, a throw-off device in the path of the other one of the fingers of the push-bar, and a latch for the drawer.

8. A cash-register comprising a register-board, ball-indicators, guides for the indicators, a shutter at the front of the register-board, accounts of cash receipts upon the inner side of the shutter, gates controlling the indicators, a base for the gates and adapted to permit the balls of the indicators to pass therethrough from the gates, a trough for the balls, a drawer for the balls, operating-keys, key-levers, tellers, means connected with the key-levers and the gates and also with the tellers whereby the gates and the tellers may be operated, a rocking bar connected with the gates, a bell, means connected with the rocking bar whereby the bell may be sounded, a cash-drawer, a drawer-latch, means connected with the latch and the rocking bar whereby the latch may be released from the drawer, a treadle mounted near the tellers and adapted to withdraw the same from view, and means connected with the drawer and the treadle whereby the treadle may be operated.

9. A cash and credit account cabinet comprising a register-board, indicators coöperating with the board, gates controlling the indicators, a base supporting the gates, gate-levers, key-levers connected with the gate-levers, keys for the key-levers, a cash-drawer, a drawer-latch, means connected with the gate-levers and also with the key-levers whereby the latch may be released, tellers, means for operating the tellers, a bell, means for operating the bell, a shutter at the front of the register-board, and billing-leaves pivoted at the front of the shutter.

10. A cash and credit account cabinet comprising a register-board, indicators, means whereby the indicators may be operated, tellers, separate operating mechanism for the tellers, key-levers for the indicators, keys connected with the key-levers, a shutter mounted at the front of the register-board, billing-leaves pivoted at the front of the shutter, balance-springs for the shutter and the billing-leaves, and guard-plates attached to the shutter and the billing-leaves and having the index-letters thereon.

11. A cash-register comprising a case, a register-board, ball-indicators, guides for the indicators, gates controlling the indicators, a base supporting the gates, an inclined trough extending below the base, a drawer extending below the lower end of the trough transversely thereof, pivoted levers connected with the gates, key-levers pivoted at the rear of the case, links connected to the pivoted levers and also to the key-levers, a movable arm operatively connected with the gates and the pivoted levers, a cash-drawer, a latch for the drawer, and means operatively connected with the movable bar and also with the latch whereby the latch may be actuated.

12. A cash-register comprising a register-board, indicators coöperating with the register-board, gates controlling the indicators, a base supporting the gates, a glass plate immediately at the front of the register-board supporting the indicators laterally in one direction, guides for the indicators coöperating with the glass plate, key-levers connected with the gates, a pivoted shutter at the front of the register-board, and a balance-spring for the shutter.

13. A cash-register comprising a register-board, indicators, key-levers, gates controlling the indicators, tellers having stems, arms having fingers adapted to elevate the tellers, frictional devices engaging the teller-stems and supporting the same in their elevated positions, a treadle adapted to engage the teller-stems and depress the tellers, means operatively connecting the arms with the key-levers and the gates, and means whereby the treadle may be operated.

In testimony whereof I affix my signature in presence of two witnesses.

CHARLES YORGER.

Witnesses:
WM. H. PAYNE,
E. T. SILVINS.